(12) United States Patent
Arsava et al.

(10) Patent No.: US 10,900,186 B2
(45) Date of Patent: *Jan. 26, 2021

(54) SYSTEMS AND METHODS FOR IN-SITU CLEAN UP OF BURNABLE MATERIALS

(71) Applicant: Worcester Polytechnic Institute, Worcester, MA (US)

(72) Inventors: Kemal S. Arsava, Worcester, MA (US); Ali S. Rangwala, Worcester, MA (US); Glenn Mahnken, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/220,428

(22) Filed: Dec. 14, 2018

(65) Prior Publication Data

US 2019/0127937 A1 May 2, 2019

Related U.S. Application Data

(63) Continuation of application No. 15/260,601, filed on Sep. 9, 2016, now Pat. No. 10,167,602.

(Continued)

(51) Int. Cl.
*E02B 15/04* (2006.01)
*F23D 3/40* (2006.01)
*F23G 7/04* (2006.01)
*B09C 1/06* (2006.01)
*F23G 7/14* (2006.01)
(Continued)

(52) U.S. Cl.
CPC ........ *E02B 15/042* (2013.01); *B01D 17/0202* (2013.01); *B09C 1/062* (2013.01); *C02F 1/02* (2013.01); *F23D 3/40* (2013.01); *F23G 5/00* (2013.01); *F23G 7/008* (2013.01); *F23G 7/04* (2013.01); *F23G 7/05* (2013.01);
(Continued)

(58) Field of Classification Search
CPC .................................................... E02B 15/042
See application file for complete search history.

(56) References Cited

U.S. PATENT DOCUMENTS 1,584,492 A 5/1926 Taylor
3,586,469 A 6/1971 Molin et al.
(Continued)

FOREIGN PATENT DOCUMENTS

WO 2011028188 A1 3/2011

OTHER PUBLICATIONS

Shi, et al., "Hydrocarbon Poll Fire Behavior around Vertical Cylinders," 8th U.S. National Combustion Meeting, May 19, 2013. (Year: 2013).*

(Continued)

*Primary Examiner* — Avinash A Savani
*Assistant Examiner* — Deepak A Deean
(74) *Attorney, Agent, or Firm* — Greenberg Traurig, LLP; Roman Fayerberg

(57) ABSTRACT

The present disclosure provides devices and methods for cleaning up or burning spills of burnable materials in situ. In some embodiments, a system for burning a burnable material comprises a base having a first side configured for placement on a surface with a burnable material and a second side; and a plurality heat conducting members extending from the second side of the base.

17 Claims, 7 Drawing Sheets

Related U.S. Application Data

(60) Provisional application No. 62/216,605, filed on Sep. 10, 2015.

(51) Int. Cl.

| | | |
|---|---|---|
| *F23G 5/00* | (2006.01) | |
| *C02F 1/02* | (2006.01) | |
| *F23G 7/00* | (2006.01) | |
| *F23G 7/05* | (2006.01) | |
| *B01D 17/02* | (2006.01) | |
| *C02F 101/32* | (2006.01) | |

(52) U.S. Cl.
CPC ............ *F23G 7/14* (2013.01); *B09C 2101/00* (2013.01); *C02F 2101/32* (2013.01)

(56) References Cited

U.S. PATENT DOCUMENTS

| | | | |
|---|---|---|---|
| 3,659,715 A | * | 5/1972 | Shaler .................... C02F 1/681 |
| | | | 210/242.3 |
| 3,663,149 A | | 5/1972 | Heagler |
| 3,695,810 A | | 10/1972 | Heagler |
| 3,905,351 A | | 9/1975 | Hatfield et al. |
| 4,185,953 A | | 1/1980 | Schirneker |
| RE30,725 E | | 9/1981 | Meeker |
| 4,669,972 A | | 6/1987 | Koblanski |
| 4,923,332 A | | 5/1990 | Sanocki et al. |
| 5,407,575 A | | 4/1995 | Vinsonhaler |
| 6,852,234 B2 | | 2/2005 | Breitenbeck |
| 6,991,453 B2 | | 1/2006 | Decker et al. |
| 8,366,439 B2 | | 2/2013 | Ashline et al. |
| 8,894,862 B2 | | 11/2014 | Champ |
| 10,167,602 B2 | | 1/2019 | Arsava et al. |
| 2009/0238717 A1 | | 9/2009 | Nolan et al. |
| 2012/0040296 A1 | | 2/2012 | Ashline et al. |
| 2013/0084533 A1 | | 4/2013 | Begg et al. |
| 2013/0202357 A1 | * | 8/2013 | Champ ............... E02B 15/0821 |
| | | | 405/63 |
| 2013/0263766 A1 | | 10/2013 | Goruney et al. |
| 2014/0057219 A1 | | 2/2014 | Nolan et al. |
| 2014/0182296 A1 | | 7/2014 | Zimmels et al. |
| 2014/0205272 A1 | | 7/2014 | Midgette et al. |
| 2016/0123582 A1 | | 5/2016 | Rangwala et al. |
| 2017/0073918 A1 | | 3/2017 | Arsava et al. |

OTHER PUBLICATIONS

Rangwala, et al., "A Novel Experimental Approach to Enhance Burning of Oil-Water Emulsions by Immersed Objects," Final Report, Worcester Polytechnic Institute, Sep. 14, 2015.

Rangwala, et al., "Burning Behavior of Oil in Ice Cavaties," Final Report, Worcester Polytechnic Institute, Dec. 30, 2013.

Shi, et al., "Hydrocarbon Poll Fire Behavior around Vertical Cylinders," 8th U.S. National Combustion Meeting, May 19, 2013.

Shi, et al., "Influence of Immersed Objects on Liquid Pool Boilover," 2013 AIChE Annual Meeting, Nov. 3, 2013.

PCT International Search Report and Written Opinion issued in International Application No. PCT/US2015/058330 dated Nov. 29, 2016.

U.S. Appl. No. 15/260,601, 2017-0073918, filed Sep. 9, 2016, Mar 16, 2017, Systems and Methods for In-Situ Clean up of Burnable Materials.

* cited by examiner

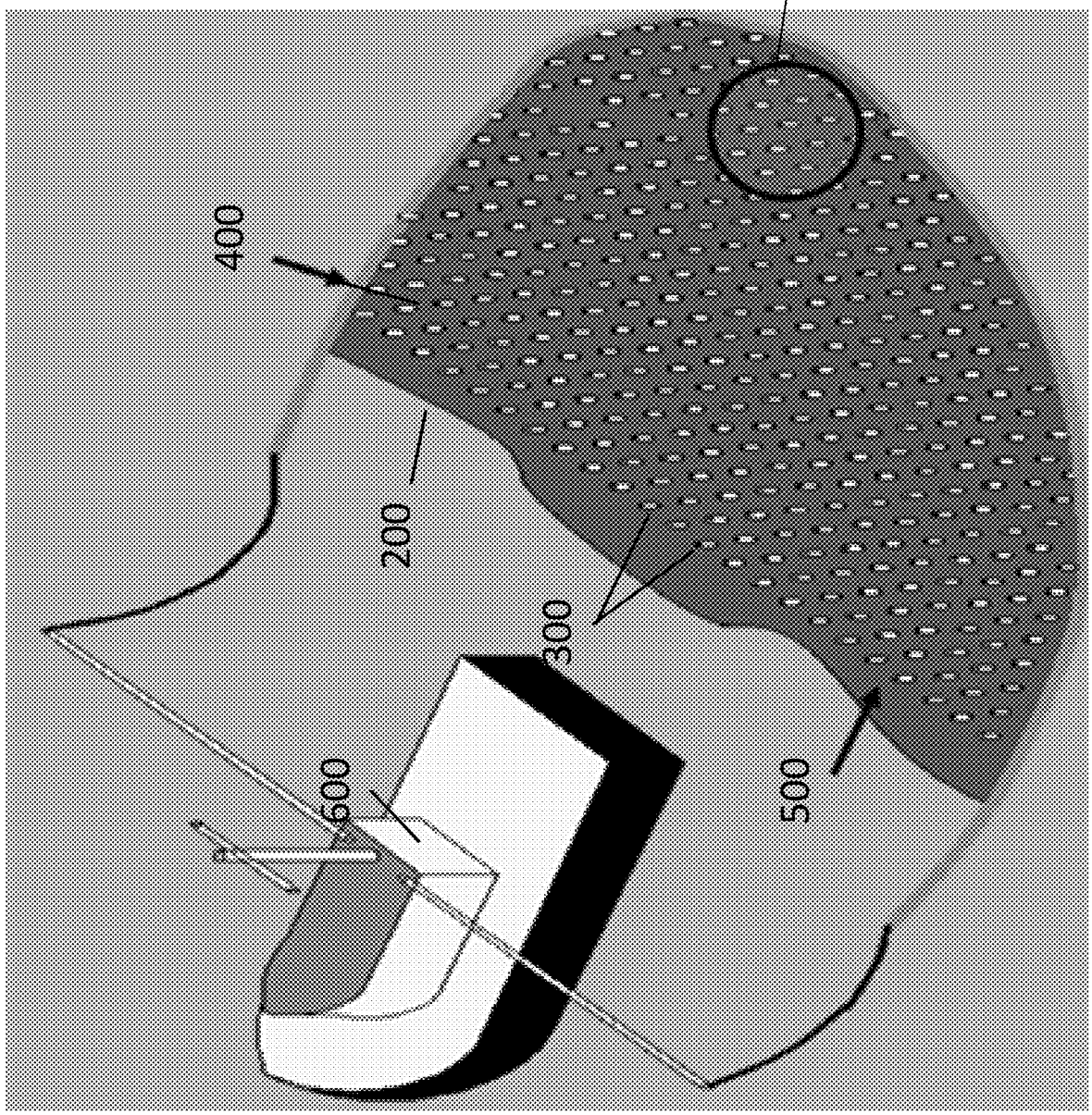

SYSTEMS AND METHODS FOR IN-SITU CLEAN UP OF BURNABLE MATERIALS

FIELD

This application is a continuation patent application of U.S. application Ser. No. 15/260,601, filed Sep. 9, 2016, which claims the benefit of and priority to U.S. Provisional Application Ser. No. 62/216,605, filed on Sep. 10, 2015, each of which are incorporated herein by reference in their entireties.

FIELD

The disclosure relates generally to systems and methods for cleaning up spills of burnable materials. In particular, the presently disclosed systems and methods may be used to enhance the burning rate of spilled fuels or oils to enable their clean-up in situ.

BACKGROUND

Oil spills from shipwrecks, drilling platform blow-outs and pipeline failures may have a devastating impact on the surrounding environment. For example, spilled oil penetrates into the plumage of birds and the fur of mammals, reducing its insulating ability, and making them more vulnerable to temperature fluctuations and much less buoyant in the water. Clean up and recovery from an oil spill is difficult and may take weeks, months or even years. One method of cleaning up and disposing of the spilled oil is by collecting and burning it "in situ", but current in situ burning technology is inefficient and slow or requires complicated, expensive mechanical systems which subject to malfunction and break down.

Therefore, there is a need for improved, less costly methods and systems to clean-up and dispose of oil spills by burning.

SUMMARY

The present disclosure provides devices and methods for cleaning up or burning spills of burnable materials in situ. In some embodiments, a system for burning a burnable material comprises a base having a first side configured for placement on a surface with a burnable material and a second side; and a plurality heat conducting members extending from the second side of the base.

The base can comprise a porous matrix or can comprise one or more planar screens. The heat conducting members may have high thermal conductivity and can be formed from metallic wire. They may be shaped to have a high surface area to volume ratio. In some embodiments, the heat conducting members are only disposed at the periphery of the base, with the central region of the base being free of the heat conducting members.

In some embodiments, the present disclosure provides a method for burning a burnable material that comprises placing on top of a burnable material a first side of a porous matrix, wherein a plurality of heat conducting members extend from a second side of the porous matrix; allowing the porous matrix to absorb at least some of the burnable material; and igniting the burnable material.

In some embodiments, the present disclosure provides a method for burning a burnable material that comprises placing on top of a burnable material a first side of a planar screen, wherein a plurality of heat conducting members extend from a second side of the screen; allowing the screen to become submerged into the burnable material; and igniting the burnable material.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 3 illustrates an embodiment of a system and method for clean-up of burnable materials of the present disclosure FIG. 4A and FIG. 4B demonstrate the enhancement in burning due to a porous blanket;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The disclosure relates generally to methods and devices, floating on bodies of water such as oceans, lakes, inland seas and streams and rivers and land-based, utilizing certain non-combustible and thermally conductive objects that may act to enhance the burning rate of burnable materials material by significantly increasing heat feedback from the flames to the unburned fuel. In particular, methods and devices relating to aspects aimed at heating the fuel below the combustion zone on the surface of a burning liquid fuel body. In some embodiments, the presently disclosed devices and methods can achieve efficient preheating of the fuel without, or as a supplement to, atomization in heating equipment and waste incinerators.

In some embodiments of the present disclosure, a system for enhancing a burn of a burnable material is disclosed. Burnable materials include any material that can be burned. For example, the burnable materials can include, but not limited to, fuels or other materials that are flammable or combustible. For example, at room temperature, flammable materials can give off enough vapor to form burnable mixtures with air. As a result, they can easily catch fire with the help of minimal ignition source. Burnable materials require higher temperatures to release enough vapor to form burnable mixtures with air.

Figure 1A:
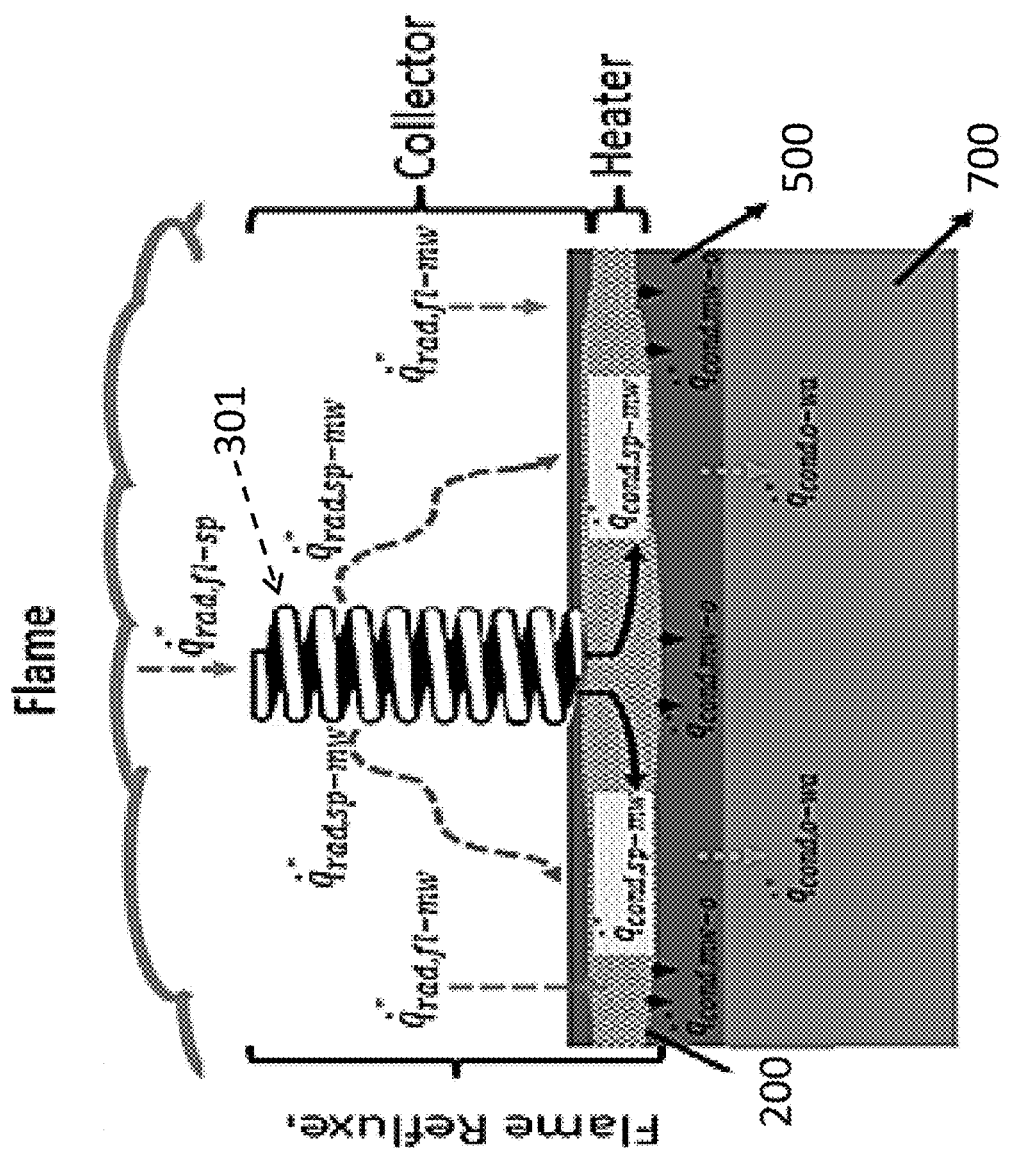
FIGS. 1A-1B illustrate embodiments of a system for clean-up of burnable materials of the present disclosure.
Figure 1B:
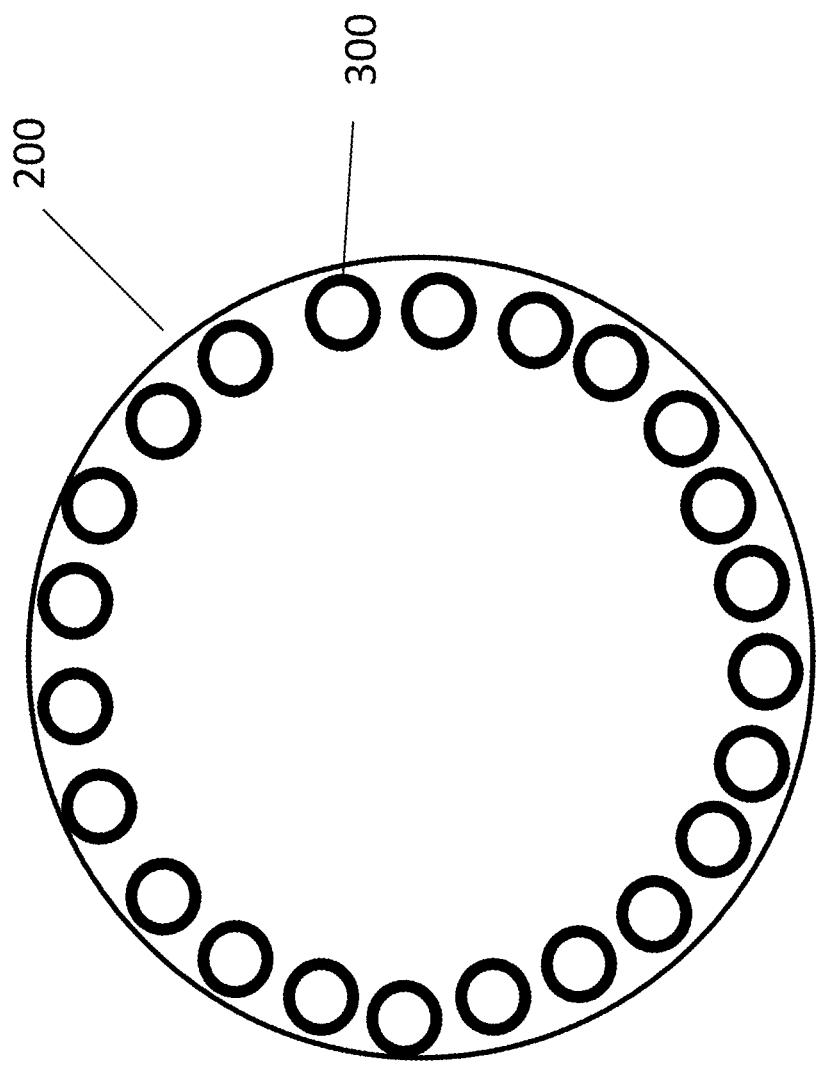

In reference to FIG. 1A and FIG. 1B, in some embodiments, the present system 100 may include a base 200 and one or more heat conductive members 300 disposed throughout the base 200. The base 200 may be laid on top of burnable materials 500 located on a surface 700, which can be a liquid (water) or a solid (ground). As seen in FIG. 1A, the burnable material may be located on a surface of any body of water, or it may be on land. The In some embodiments, the system may be used as a burner in equipment used for producing heat, such as an industrial boiler, or for incineration to dispose of certain waste chemicals or hazardous materials or spills of such materials. The burnable material 500 may be a liquid or semi-solid or other flowable substance to enable the base to wick or absorb the burnable material, to be placed under the surface of the burnable material, or both. The burnable material 500 can be any burnable hydrocarbon material such as liquid fuel, oil, oil-water emulsion or some other type of fuel substance. In some embodiments the burnable material 500 may be organic waste, such as human waste. In some embodiments the burnable material 500 may be located on the surface of a body of water, such as a lake, river, sea or ocean. In some embodiments, the burnable material may be located on land, in a structure, or in a room or lab or office.

Figure 2:
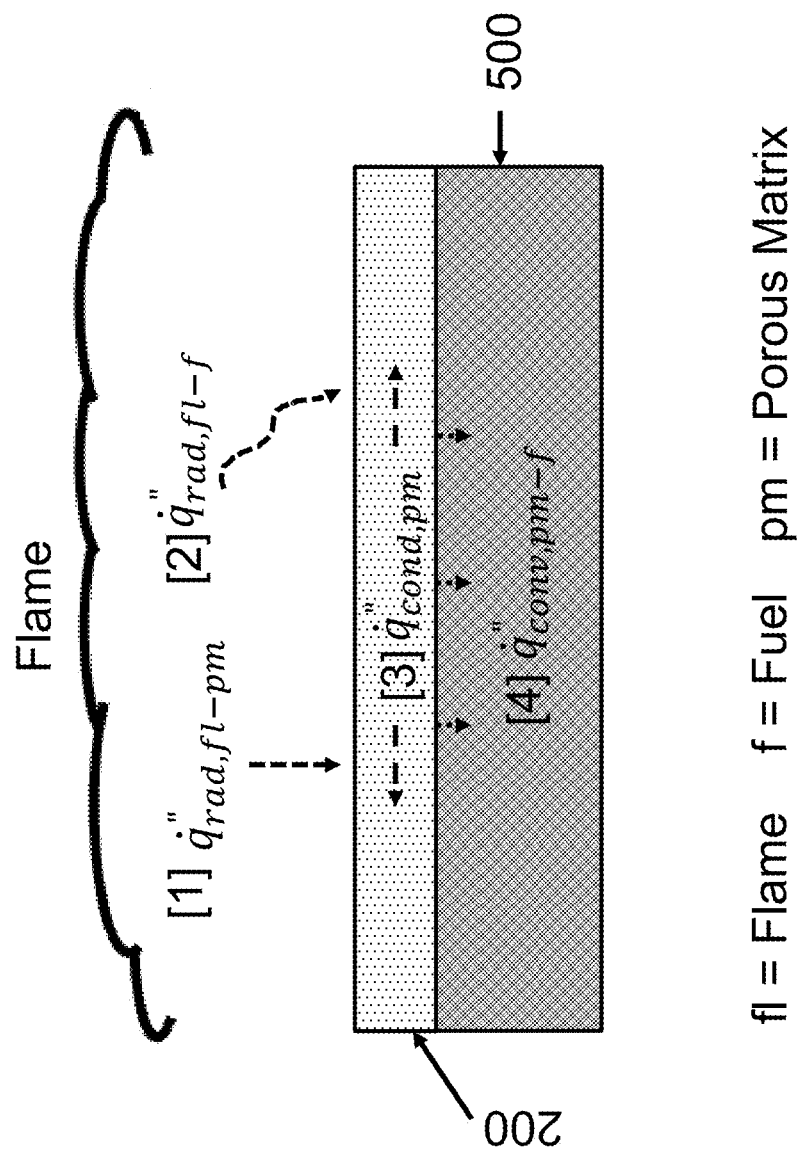
FIG. 2 illustrates a heat transfer mechanism in the systems of the present disclosure.

Referring back to FIG. 1A and FIG. 1B, the base 200 may be made of a metallic or non-metallic material, engineered composite materials. The metal may be, for example, copper, iron, steel or aluminum. In some embodiments the porous matrix 200 may enhance heat transfer from a flame of a burn of the burnable material 500 back to the unburned burnable material (or fuel) 500 to achieve a higher fuel vaporization and burning rate as compared to a simple fire of the burnable material 500. For example, in reference to FIG. 2, the heat transfer mechanism of a burnable material 500 with porous matrix 200 is shown, with the following components: the radiative heat transfer from flame to the porous matrix 200 [1] and to the surface of the burnable material [2]; the conductive heat transfer in porous matrix 200 in horizontal direction [3], and the convective heat transfer from porous matrix 200 to the burnable material [4]. This feedback system may improve the evaporation rate, thereby increasing the mass burning rate and further enhances the heat received by the porous matrix 200 from the flame. For example, the thermal conductivity of a metal base may be in the range of 16 W/mK to 401 W/mK, depending on the material used to form the matrix. A nonmetallic base can be made, for example, from graphite (80 W/mK) can be used as an alternative.

The base 200 can be in a form of a metal or non-metal planar screen or mesh. In some embodiments, the base 200 can comprise multiple layers of such planar screen or mesh.

In some embodiments, the base 200 may be in a form of a porous matrix. In some embodiment, the porous matrix may be a blanket comprising porous material. In some embodiment, the porous matrix may in a form of a sponge or foam. The porous matrix may be formed from materials with high thermal conductivity and surface properties which are conducive to fuel wicking and heat transfer. A CFD (Computational fluid dynamics) model can be used to determine the most effective surface property. In some embodiments, the size of the pores (porosity) of the porous material may be optimized to maximize the enhanced heat transfer for a specific burnable material 500. Porosity of the material will be such that sufficient surface area is provided for heat transfer while at the same time the volume of void spaces is sufficient to allow fuel flow rates needed to sustain the burning rate and prevent clogging. For example, high porous matrix 200 can be deployed for viscous and heavy fuels (water-in-oil emulsion). Larger gaps in the media will not clogged by burned residue and allow viscous fuel to penetrate deeper. For light fuels, low porous matrix 200 can be used. However, the range of porosity for different fuels is not studied yet.

A thickness of the porous material may also be adjusted and/or optimized for any given burnable material 500. Thickness of the material will be such that sufficient surface area is provided for heat transfer while at the same time allowing fuel to flow as needed to sustain the burning rate. The thickness of the porous matrix may be a function of fuel type, fuel thickness and environmental conditions (ambient temperature, wind, moisture, etc.). CFD (Computational fluid dynamics) model can be used to provide the relationship between fuel thickness and matrix 200 thickness. Optimization of porosity and thickness, in some embodiments, may be based on thermal conductivity, density, thickness, latent heat of vaporization and specific heat of the burnable material 500. These thermodynamic and thermo-physical properties of the fuel may affect the required energy for sustained combustion, and burning efficiency. In some embodiments, the porous matrix may act as a wick for the burnable material 500, conveying the burnable material to the vaporization or pyrolysis zone of the burn.

In some embodiments the base 200 may be configured to be rollable, stackable or foldable for storage, such that multiple blankets may be used to increase the surface area of the burn covered by the system. In some embodiments, the porous matrix may be buoyant, such as a matrix of sealed metallic or non-metallic tubes. In some embodiments, the porous matrix may further be supported by a flotation device such as a pontoon to which it is attached by welding or mechanical fasteners.

After the burn (post burn) of the burnable material, there is typically a tarry solid residue which is difficult to collect and may represent an environmental hazard. The amount and properties of the burn residue depend on many factors and are difficult to predict. In one reported test, approximately 300 gallons of stiff, taffy-like residue was left from burning 15-30000 gallons of crude oil. In some embodiments, the porous matrix may capture post burn residue, improving the cost, efficiency and ease of post burn cleanup. Wicking capability of the porous matrix may allow residue to accumulate on it.

Still referring to FIG. 1A and FIG. 1B, the heat conducting members 300 can have different shapes, including, but not limited to, coils (as demonstrated in FIB. 1B), springs, or rods which may further be round, square, hexagonal oval, independent of other rods in the enclosure. The heat conducting members 300 may have shapes including a linear and non-linear shape, uniform or non-uniform shape, one or more protrusions (also referred to as "fins") that are one of linear and/or non-linear shape that extend from an outer surface of the heat conducting member 300. In some embodiments the heat conducting members 300 may have a shape from a group consisting of a mushroom shape, a wave shape or a spiral shape. In some embodiments, the heat conducting members may have a shape with a high ratio of the surface area to volume. In some embodiments, the heat conducting members 300 may have a pyramidal or spherical (dome-like) shape. In some embodiments, the heat conducting members may be formed from a wire. In some embodiments, the heat conducting members 300 may be an accordion-shaped, hollow cylinder, which may also act as a flotation device when attached to the porous matrix. It is possible the heat conducting members 300 may have a textured surface, smooth surface or some combination thereof. In some embodiments, a CFD (Computational fluid dynamics) model will be used to determine the most effective relationship between flame exposed object height and immersed object height.

The heat conducting members 300 may be disposed on the base in any desired pattern. In some embodiments, as shown in FIG. 1B, the heat conducting members 300 may be disposed only along the periphery or rim of the base 200. In some embodiments, the heat conducting members can be disposed in a grid covering substantially the entire base 200, as shown in FIG. 1C. In some embodiments, the conductive members 300 may be of different heights depending on their location throughout the base 200. For example, the height of the heat conductive members may increase toward the periphery of the base 200. In some embodiments, the height of the heat conductive members may decrease toward the periphery.

The heat conducting members 300 may be formed from a variety of heat conductive metallic or non-metallic materials, including but are not limited, to copper, steel, carbon, and similar materials. For example, copper has very good thermal diffusivity ($1170 \times 10^{-7}$ m$^2$/s) and good heat resistance (melting temperature of 1358° K compared with the typical gas temperature in the flaming region of 1100° K).

Given a material type chosen for the heat conducting member 300, based on the thermal conductivity and the melting point, the burning rate may be controlled by varying one or more of such parameters as height above the burnable material 500, the number of heat conducting members 300 and placement of the members 300. The thermal conductivity of the heat-collecting heat conducting members 300 may be in the range of 16 W/mK to 401 W/mK. Melting point of the heat conducting members 300 may vary between 1085° C. and 1370° C. The height and number of the heat conducting members 300 may be selected based on fuel type, fuel thickness and environmental conditions (ambient temperature, wind, moisture, etc.).

The diameter of the heat conducting members 300 can be based on structural considerations. An increase in the height and number enables more heat to be transferred to the liquid fuel, thereby increasing the mass-burning rate. However, the distribution of the heat conducting members 300 and height of each heat conducting member 300 may need to be optimized since heat transfer from the flame to the fuel surface is not uniform. Thinner objects (lower diameter) are preferable as they can heat up faster. In some embodiments, the height of the heat conducting members 300 may be in the range of expected flame height. In some embodiments, the heat conducting members 300 may be affixed to the base by any known technique.

In some embodiments, the height "h" of the heat conducting members 300 above the liquid surface may be adjustable. The height of the heat conducting members 300 may depend on the percentage of the water in burnable material 500, among other variables. As an example, the optimum height for 15% emulsion will not be optimum for 50% emulsion. In some embodiments, the system 100 of the present disclosure may be configured to monitor and control the burn in real time. The system 100 of the present disclosure can be instrumented with a smart control system that may include a data acquisition system to monitor the temperature of the heat conducting members 300 and a controller to optimize the "h" value. The desired burning efficiency may be achieved when the heat conducting members 300 are fully exposed to flames. As the water content increases, the flame height decreases and the heat conducting members 300 partially enveloped by flame are subjected to higher heat loss. The range of the "h" can vary between 0 to expected flame height.

As the heat conducting members 300 subsequently heat up, the burnable materials 500 can burn hotter. Thus, additional heat is transferred through the heat conducting members 300 to the burnable materials 500. A part of the heat lost to the environment in the form of flame radiation and convection can now be collected by the heat conducting members 300. Further, Marangoni effects, cause liquid-phase motion, improve mixing and further increase the heating rate and therefore the burning rate. This heating is proportional to the geometry of the object, and material properties such as thermal diffusivity. With an optimal position and geometry of one or more heat conducting members 300, the average regression rate can reach 25 mm/min or more, that is 10 or more times higher than current in situ burning methods. Additionally, a portion of the heat that is produced by the fire, is not wasted through convection and radiation to the ambient, but is collected and used to vaporize the unburned burnable materials 500. Further, the adjustable members 300 can provide for an enhanced ability to direct the radiative and convective heat generated by the combustion back to the burnable materials 500 to create a feedback loop effectively to sustain the burning efficiency even at high liquid fuel-non-fuel emulsions, i.e. oil-water emulsions. In a confined fire, the mass burning rate is a function of emulsion type, ullage (fuel level) and environmental conditions (ambient temperature, wind, moisture, etc.). Thus, it becomes challenging to optimize the object height for different fuel types and burning conditions. In this context, linear actuators can be integrated into a sophisticated control system to provide precise position feedback and accurate control of the object height. From ignition of the fuel, temperature of the fuel and heat conducting member 300 can be monitored in real time. By using the temperature data, the smart control system can send signals to linear actuators. As an example, if the data acquisition system senses a decrease in fuel temperature, the controller can be prompted to adjust the current signal on the linear actuators to optimize the object height.

Both parametric (P, PI or PID) and non-parametric (Fuzzy logic) control systems can be adapted into the system. The key controlling parameters are the fuel, member 300 and base 200 temperatures. The controller may be configured to adjust the "h" to keep the base 200 temperature above the fuel's saturation temperature. The high temperature difference may result in nucleate boiling, which increases the thermal output from the base 200 to fuel Because an emulsion with high water content may be hard to ignite, the systems of the present disclosure may further include hot igniters and accelerators, such as gelled fuel mixtures or similar. In some embodiments, the heat conductive members 300 may be preheated before igniting the emulsion or burnable material 500. In some embodiments, because a heat flux from the flame to the fuel surface may be non-uniform, multiple objects placed in the fuel may be heated non-uniformly. In some embodiments, one or more of the heat conducting members 300 can be preheated or additional heat may be added during burning to ensure uniform heating of the objects.

Further, soot deposition on the heat conductive members 300 may also be uneven which may lead to unsteady behavior after some time duration. Soot deposition in the enclosure 400 may also impact the efficiency. To combat that problem, a variety of methods for management of soot deposition may be employed, including the base 200 binding the soot and removing it from the burn.

It is likely that enhanced burning rate can promote higher flame temperatures thereby aiding in complete combustion of the burnable material 500 and reducing quantity of unburned products of combustion. The initial heating of the conductive members 300 may cause an increase in the emissions because they can act as a heat sink during the initial stages. Accordingly, in some embodiments, the systems of the present disclosure may be equipped with exhaust systems.

As noted above, the characteristics of the base 200 as well as of the heat conductive members 300 and air inlets 250 may impact the burning rate of the burnable material 500. These parameters may be optimized for specific conditions using Computational Fluid Dynamics (CFD). For example, a commercial 3-D CFD tool, ANSYS-Fluent, can be used to solve for transient flow, heat transfer, and evaporation of an oil and water emulsion within a burn, determining optimum combinations of object height, diameter, surface area, and surface area spacing.

In reference to FIG. 3, the system 100 of the present disclosure may include an enclosure 400 configured to hold the base 200 as well as the burnable material 500. In some embodiments the enclosure 400 may be attached to a vehicle 600, such as a boat, which can tow the enclosure 400 along the surface 700 with the burnable material 500. In some embodiments the enclosure 400 is a fire resistant boom. In some embodiments, the enclosure 400 may further comprise a plurality of air inlets. Exemplary patterns for a plurality of air inlets, and mechanisms associated thereof, are disclosed in U.S. Provisional Patent Application 62/164,199 filed May 20, 2015 which is hereinafter incorporated fully by reference.

In some embodiments, methods for cleaning up spills of burning materials are disclosed. These methods may allow the clean up to proceed in situ, without a need to transfer the burnable materials to a different location. In some embodiments, the systems of the present disclosure may be placed on the spilled burnable material and the burnable material may be ignited. Once the burnable material in the vicinity of the present system is sufficiently burnt or cleaned up, the system may be moved to a different location in the spill. Such location can be discrete from the original location or may overlap with the original location.

In some embodiments, where the base is a porous matrix, the method for clean-up may include placing the system on top of a burnable material; allowing the porous matrix to absorb at least some of the burnable material; and igniting the burnable material. In some embodiments, where the base comprises one or more planar screens, the method for clean-up may include submerging the base into the burnable material and igniting the burnable material.

In some embodiments of the present disclosure, a system for enhancing a burn of a burnable materials or material is disclosed comprising a porous matrix, or blanket, which may be laid on top of a burnable materials or material to collect heat from the flames and transfer it back to the unburned fuel in order to enhance burning of the burnable material. The burnable material may be located on a surface of any body of water, or it may be on land. In some embodiments, the burnable material may be stored in a tank or silo and pumped or conveyed to the blanket. The blanket may be used on heating equipment utilizing liquid or solid fuel or as part of an incinerator for disposal or clean-up of combustible chemical or hazardous material, which may be waste from a production process or recovered from a spill.

In some embodiments, the porous matrix may act to increase the effective heat transfer surface area of the burn and in combination may act as a "wick" to enhance the uptake of fuel. As a result, the burning rate of the burnable material is significantly enhanced by increasing the transfer of heat from the flames back to the unburned fuel. In some embodiments the porous matrix may enable a more effective collection of burn residue after the burn is complete (post burn). In some embodiments, the porous matrix may be a metal wool, sponge or mesh. In some embodiments, the porous matrix may be a nonmetallic wool, sponge or mesh. In some embodiments, the porous matrix may be buoyant. In some embodiments the porous matrix may further comprise or be supported by a flotation device. In some embodiments, the porous matrix further comprises a grid of heat-collecting thermally conductive objects ("fins") located in the combustion zone above the unburned fuel and attached to the porous material blanket, wherein the attached objects further increase heat transfer to the blanket and thus increase the burning rate. In some embodiments, the heat-collecting thermally conductive objects are coils or springs or other shapes which act as heat transfer "fins. In some embodiments, the coils have a height above the material sufficient to maximize heat collection from the flames and therefore the enhancing of the burning rate. In some embodiments the porous matrix is a blanket. In some embodiments the blanket may be configured to be stackable or foldable or rollable for storage, such that multiple blankets may be used to increase the surface area of the burn covered by the system.

In some embodiments the system may further comprise an enclosure which may contain the porous matrix. In some embodiments, the enclosure is buoyant, such as a boom, and may be dragged behind a vehicle, such as a boat. In some embodiments, the enclosure may further comprise a plurality of adjustable air inlets disposed throughout the enclosure. In some embodiments the enclosure may further be subdivided into a set of enclosed burners with air spaces between them such that the air spaces promote convective mixing of air with the flames to further enhance combustion through a synergetic effect ("flame merging"). In some embodiments, the enclosure is a casing or shell, such as the casing or shell of a standard industrial boiler or incinerator.

In some embodiments, the system for burning a burnable material comprises a porous matrix or blanket of metal or nonmetallic mesh, the mesh enhancing the heat transfer from the flames of a burning burnable material back into the unburned material, wherein the porous matrix enhances the collection of burn residue of the burnable material after the burn is extinguished. In some embodiments, the system further comprises a grid of heat conductive objects attached to the porous matrix. In some embodiments, the system further comprises a plurality of adjustable air inlets disposed throughout the enclosure. In some embodiments, the system further comprises an enclosure that contains the porous matrix and which may be attached to and dragged behind a boat or used as a burner in heating equipment or incinerators for disposal of combustible waste material.

The systems and methods of the present disclosure are described in the following Examples, which are set forth to aid in the understanding of the disclosure, and should not be construed to limit in any way the scope of the disclosure as defined in the claims which follow thereafter. The following examples are put forth so as to provide those of ordinary skill in the art with a complete disclosure and description of how to make and use the embodiments of the present disclosure, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

EXAMPLES

Improvement of Mass Loss (Burning) Rate

Figure 4A:
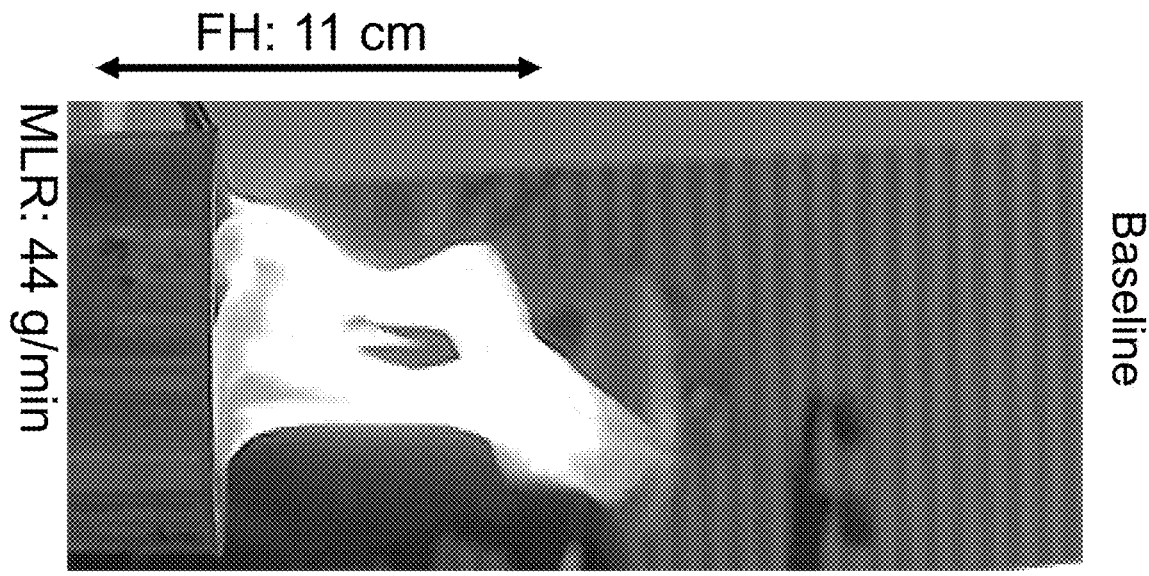
Figure 4B:
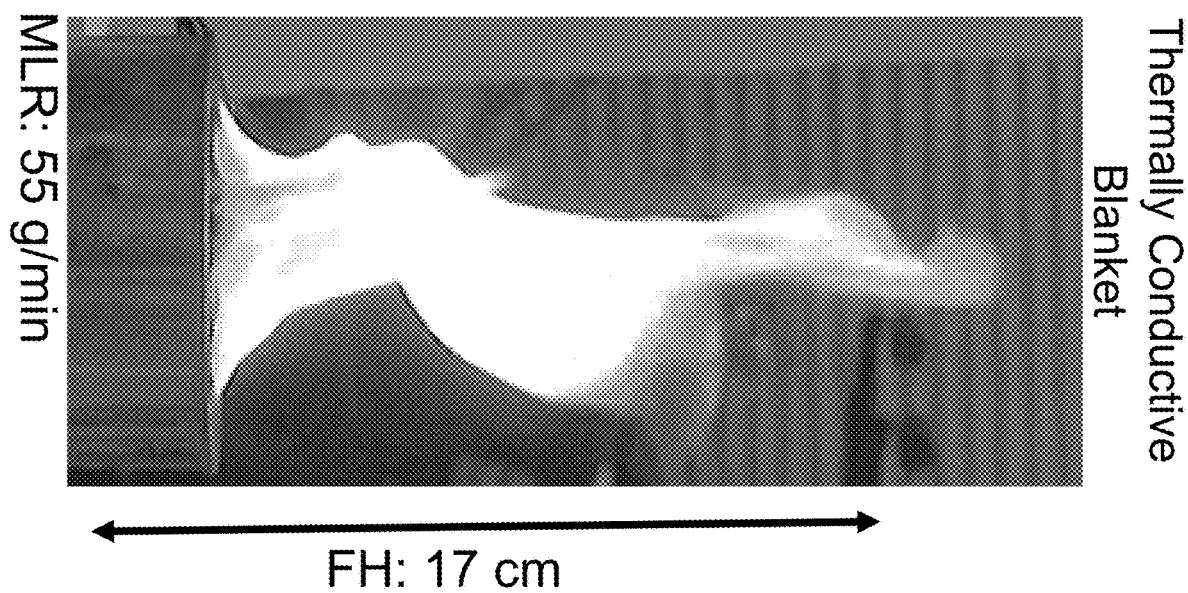
Figure 5:
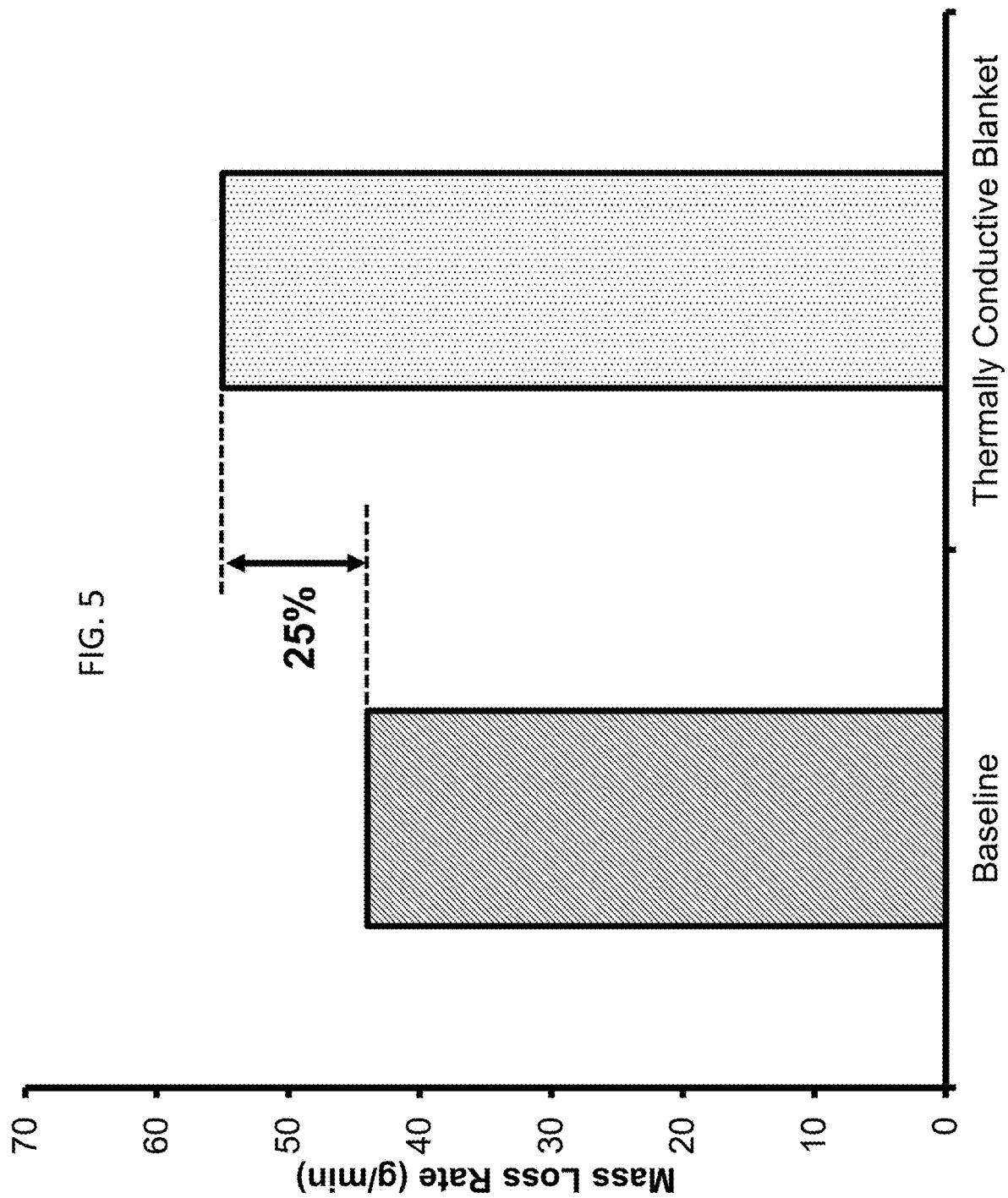
FIG. 5 shows the percent increase in burning rate due to the burner blanket.

FIG. 4A and FIG. 4B show the enhancement in burning caused by porous metal wool blanket. The fuel used was dodecane in a burner with a diameter of 10 cm. FIG. 4A shows the burning of a dodecane pool (baseline), while FIG. 4B shows the same pool now covered by a metal (stainless steel) porous wool. FIG. 5 shows the percentage increase in burning rate due to porous blanket when compared with an experiment where no blanket was used. An increase of 25% over baseline is observed. FIG. 5 shows the efficiency represented by the ratio of the steady state mass loss rate over the baseline case.

Figure 6B:
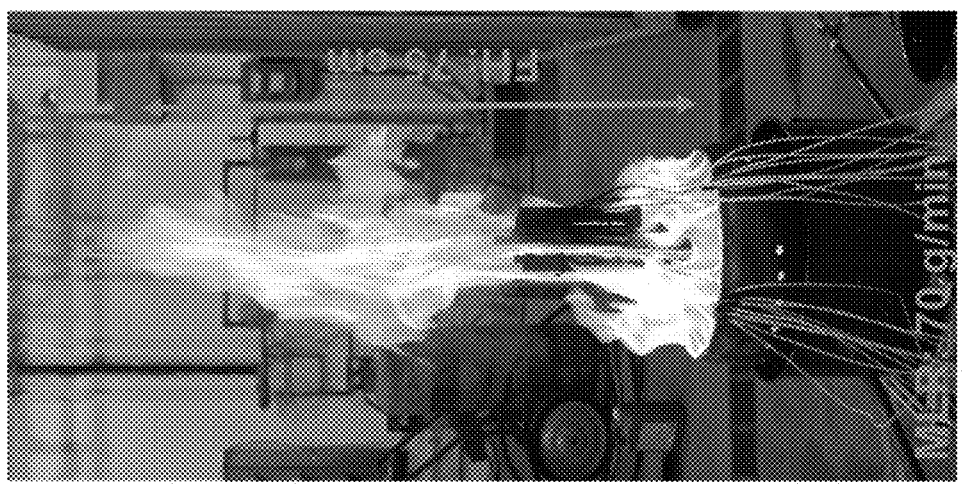
FIG. 6A and FIG. 6B show experiments for a baseline case and an enhanced case burning crude oil with an open container.
Figure 6A:
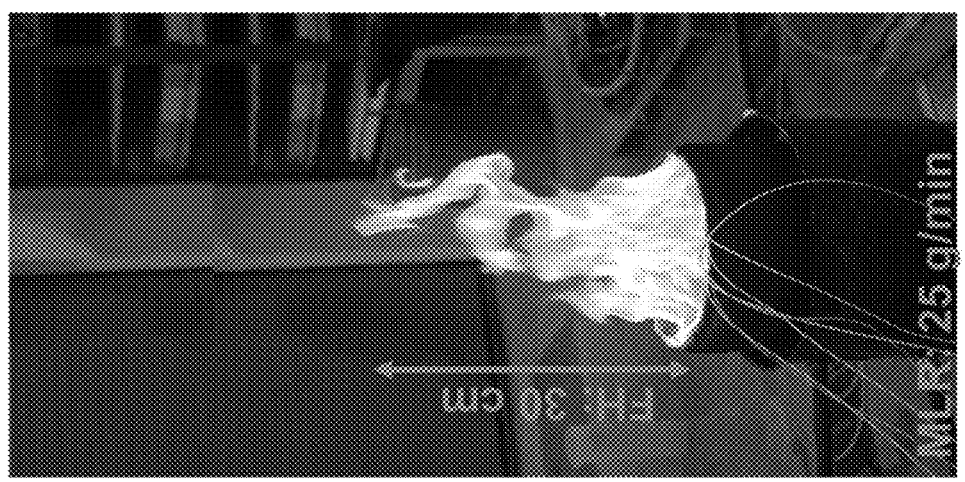

FIG. 6A and FIG. 6B show experiments for a baseline case and an enhanced case burning crude oil with an open container. The mass loss rate (MLR) (or burning rate) of the baseline case is 0.41 g/s. The system with immersed rods and air inlets increased the MLR about 200%, over the baseline case. Note that the enhanced flame height reaches a value of 75 cm.

All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It can be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

What is claimed is:

1. A system for burning a burnable material comprising:
   a base having a first side configured for placement on a surface with a burnable material and a second side opposite to the first side, the base being made of a thermally conductive material;
   a plurality of heat conducting members extending from the second side of the base and being disposed only at the periphery of the base; and
   wherein, when the base is at least partially submerged in the burnable material and the burnable material is ignited to cause the burnable material to burn, the plurality of heat conducting members act to reflux heat from burning of the burnable material back to unburned burnable material to cause nucleate boiling of the unburned burnable material.

2. The system of claim 1, wherein the base is a porous matrix.

3. The system of claim 1, wherein the base is a planar screen.

4. The system of claim 1, wherein the heat conducting members are shaped to have a high surface area to volume ratio.

5. The system of claim 1, wherein the heat conducting members are formed from metallic wire.

6. The system of claim 1 further including an enclosure around the base.

7. A method for burning a burnable material comprising:
   at least partially submerging into a burnable material a first side of a porous matrix, wherein a plurality of heat conducting members extend from a second side opposite to the first side of the porous matrix only at the periphery of the porous matrix;
   and
   igniting the burnable material to cause the burnable material to burn, wherein the plurality of heat conducting members act to reflux heat from burning of the burnable material back to unburned burnable material to cause nucleate boiling of the unburned burnable material.

8. The method of claim 7, wherein the heat conducting members are shaped to have a high surface area to volume ratio.

9. The method of claim 7, wherein the heat conducting members are formed from metallic wire.

10. The method of claim 7 further comprising disposing an enclosure around the porous matrix and the burnable material.

11. The method of claim 7 further comprising moving the porous matrix along the burnable material.

12. The method of claim 7 further comprising capturing post burn residue with the porous matrix.

13. A method for burning a burnable material comprising:
   at least partially submerging into a burnable material a first side of a planar screen, wherein a plurality of heat conducting members extend from a second side of the screen opposite to the first side only at the periphery of the porous matrix;
   and
   igniting the burnable material to cause the burnable material to burn, wherein the plurality of heat conducting members act to reflux heat from burning of the burnable material back to unburned burnable material to cause nucleate boiling of the unburned burnable material.

14. The method of claim 13, wherein the heat conducting members are shaped to have a high surface area to volume ratio.

15. The method of claim 13, wherein the heat conducting members are formed from metallic wire.

16. The method of claim 13 further comprising disposing an enclosure around the screen and the burnable material.

17. The method of claim 13 further comprising moving the screen along the burnable material.

* * * * *